United States Patent
Brück et al.

(10) Patent No.: US 7,562,805 B2
(45) Date of Patent: *Jul. 21, 2009

(54) HONEYCOMB STRUCTURE AND METHOD FOR APPLYING ADHESIVE AND BRAZING MATERIAL TO THE STRUCTURE

(75) Inventors: Rolf Brück, Bergisch Gladbach (DE); Kait Althöfer, Wiehl (DE); Jan Hodgson, Troisdorf (DE); Arndt-Udo Rolle, Siegburg (DE)

(73) Assignee: EMITEC Gesellschaft fuer Emissionstechnologie mbH, Lohmar (DE)

(*) Notice: Subject to any disclaimer, the term of this patent is extended or adjusted under 35 U.S.C. 154(b) by 161 days.

This patent is subject to a terminal disclaimer.

(21) Appl. No.: 11/523,341

(22) Filed: Sep. 19, 2006

(65) Prior Publication Data
US 2007/0012747 A1   Jan. 18, 2007

Related U.S. Application Data

(63) Continuation of application No. 10/859,426, filed on Jun. 2, 2004, now Pat. No. 7,108,168, which is a continuation of application No. PCT/EP02/14635, filed on Dec. 20, 2002.

(30) Foreign Application Priority Data
Jan. 3, 2002 (DE) .............................. 102 00 069

(51) Int. Cl.
*B23K 31/02* (2006.01)

(52) U.S. Cl. ...................... 228/181; 228/208; 428/593; 428/594; 428/598; 29/592; 29/890

(58) Field of Classification Search .................. 228/181, 228/208; 428/593, 594, 598; 29/592, 890
See application file for complete search history.

(56) References Cited

U.S. PATENT DOCUMENTS 4,381,590 A    5/1983    Nonnenmann et al.

(Continued)

FOREIGN PATENT DOCUMENTS

DE    29 24 592 A1    1/1981

(Continued)

OTHER PUBLICATIONS

Japanese Office Action dated Jul. 29, 2008.

*Primary Examiner*—Jessica L Ward
*Assistant Examiner*—Michael Aboagye
(74) *Attorney, Agent, or Firm*—Laurence A. Greenberg; Werner H. Stemer; Ralph E. Locher

(57) ABSTRACT

A method for gluing and brazing a honeycomb structure includes at least one partially structured foil with a pitch and a wave height. The method includes the steps of choosing a mean brazing material diameter of a powder brazing material, said diameter being 15% smaller than the height of the wave; determining a minimum thickness of the glue strip according to equation; gluing at least partially structured foil within the width of the glue strip on at least part of the wave crests formed by the undulation; brazing the honeycomb structure. The invention also relates to a corresponding honeycomb structure that ensures satisfactory joint connections even when said structure is used in the exhaust systems of automobiles.

17 Claims, 3 Drawing Sheets

U.S. PATENT DOCUMENTS

| | | |
|---|---|---|
| 4,521,947 A | 6/1985 | Nonnenmann et al. |
| 5,102,743 A | 4/1992 | Maus et al. |
| 5,105,539 A | 4/1992 | Maus et al. |
| 5,135,794 A | 8/1992 | Maus et al. |
| 5,139,844 A | 8/1992 | Maus et al. |
| 6,371,360 B1 | 4/2002 | Maus et al. |
| 7,108,168 B2 * | 9/2006 | Bruck et al. ............... 228/181 |
| 2001/0013390 A1 | 8/2001 | Staubwasser |
| 2002/0022145 A1 | 2/2002 | Wieres et al. |
| 2002/0061268 A1 | 5/2002 | Bruck et al. |
| 2002/0129890 A1 | 9/2002 | Staubwasser |

FOREIGN PATENT DOCUMENTS

| | | |
|---|---|---|
| EP | 0 422 000 B1 | 4/1991 |
| EP | 0 430 945 B1 | 6/1991 |
| EP | 0 436 533 B1 | 7/1991 |
| JP | 2194843 A | 8/1990 |
| JP | 6-315638 A | 11/1994 |
| JP | 7-51580 A | 2/1995 |
| JP | 8276133 A | 10/1996 |
| JP | 9-512747 A | 12/1997 |
| JP | 11-156211 A | 6/1999 |
| WO | 95/30508 | 11/1995 |
| WO | 00/44522 | 8/2000 |
| WO | 0068549 A1 | 11/2000 |

* cited by examiner

HONEYCOMB STRUCTURE AND METHOD FOR APPLYING ADHESIVE AND BRAZING MATERIAL TO THE STRUCTURE

CROSS-REFERENCE TO RELATED APPLICATIONS

This application is a continuation of application Ser. No. 10/859,426, filed Jun. 2, 2004, which was a continuation, under 35 U.S.C. § 120, of copending international application PCT/EP02/14635, filed Dec. 20, 2002, which designated the United States; this application also claims the priority, under 35 U.S.C. § 119, of German patent application DE 102 00 069.7, filed Jan. 3, 2002; the prior applications are herewith incorporated by reference in their entirety.

BACKGROUND OF THE INVENTION

Field of the Invention

The invention relates to a honeycomb structure including at least partially structured foils so that ducts through which a fluid can flow and that have a pitch and a wave height are formed, adhesive and a powderous brazing material being provided in regions of contact between the foils, within an adhesive strip width, and to a method for applying adhesive and brazing material to such a honeycomb structure.

Such honeycomb structures are used, in particular, as catalytic converter carrier bodies in exhaust gas systems of mobile internal combustion engines (for example, spark ignition engines or diesel engines or the like). Honeycomb bodies and a method for manufacturing them are disclosed, for example, in European Patent 0 422 000 B1, corresponding to United States Patent Publication Nos. 2002/0129890 and 2001/0013390, or German Published, Non-Prosecuted Patent Application DE 29 24 592, corresponding to U.S. Pat. No. 4,521,947 to Nonnenmann et al. and U.S. Pat. No. 4,381,590 to Nonnenmann et al. The latter describes a carrier matrix for a catalytic reactor for emission control of an internal combustion engine of a vehicle, which matrix is formed from high-temperature-proof steel plates. The carrier matrix is coated with a catalytic material, the steel plates being embodied as smooth and corrugated plates and being disposed alternately in layers.

With respect to the manufacturing method of such a carrier matrix, it is proposed that the steel plates, firstly, be degreased and/or pickled. The steel plates are, then, provided with a brazing material coating before they are disposed alternately in layers. Adhesive or brazing material can, then, be applied to the smooth steel plates, the corrugated steel plates or both types of steel plate. Brazing material is applied in strips in the direction of the corrugations of the corrugated steel plates, or perpendicularly thereto. After the steel plates have been stacked and wound to provide a carrier matrix, the carrier matrix is heated and all the layers or steel plates are simultaneously brazing-materialed to one another. A multiplicity of shapes and configurations of the steel plates with respect to one another are already known (S-shaped, spiral, etc.), reference being made in this respect, for example, to European Patent 0 430 945, corresponding to U.S. Pat. Nos. 5,139,844, 5,135,794, and 5,105,539 to Maus et al., or EP 0 436 533, corresponding to U.S. Pat. No. 5,102,743 to Maus et al.

Such a method has proven very satisfactory in the past, but has disadvantages, particularly with respect to the costs and the brazing quality. Although the provision of adhesive or brazing material in the form of strips already entails a reduction in the adhesive or brazing material that is used for manufacture, excessively rigid connection of the steel plates to one another, which is not desired in certain cases has, nevertheless, been detected within the scope of load testing. In this context, it has also been discovered that, particularly when very thin steel plates are used, it is important not to introduce too much brazing material into the carrier matrix because an excessive quantity of brazing material results in an increased risk of corrosion during the use of such a carrier matrix in the exhaust gas system of motor vehicles. Furthermore, the excessive provision of brazing material constitutes a cost factor that has to be allowed for, in particular, within the scope of large-scale manufacture.

A further manufacturing problem occurs when the steel plates are stacked or wrapped. Because the brazing material is already applied before the stacking or wrapping, it may also come to be disposed in the contact regions between the corrugated steel plate and the smooth steel plate so that direct contact between these plates is not ensured. During subsequent thermal treatment, the adhesive vaporizes at least partially and the brazing material melts so that gaps are formed under certain circumstances. This may result in a situation in which a joint connection between steel plates that are disposed adjacent to one another is not formed continuously over the desired connecting region. This has an appreciable influence on the fatigue strength of such a carrier matrix when the latter is subjected to thermal and dynamic conditions in the exhaust gas system of a mobile internal combustion engine.

SUMMARY OF THE INVENTION

It is accordingly an object of the invention to provide a honeycomb structure and method for applying adhesive and brazing material to the structure that overcome the hereinafore-mentioned disadvantages of the heretofore-known devices and methods of this general type and that at least partially eliminate the problems indicated with respect to the known honeycomb body and its manufacture. In particular, the honeycomb body of the present invention ensures a permanent connection between adjacently disposed sheet-metal plates and specifies a method in which only as much brazing material is deposited in the contact regions of sheet-metal plates that are disposed adjacently to one another and a method in which, regardless of the quantity of brazing material made available, only as much brazing material is deposited in the contact regions of sheet-metal plates that are disposed adjacently to one another as is necessary to form permanent connections.

Features that are disclosed there to be present individually or in combination with one another.

With the foregoing and other objects in view, there is provided, in accordance with the invention, a method for applying adhesive and brazing material to a honeycomb structure includes at least one partially structured or corrugated foil with a pitch and a wave height includes the following steps:

selection of an average brazing material diameter of a powderous brazing material that is smaller than 15% of the wave height in size;

determination of a minimum adhesive strip width according to the equation:

$$B = 2 \cdot \sqrt{D \cdot \left[\frac{1}{4} \cdot \frac{P}{W} - 0.0156\right]}$$

-continued where: $B$ = adhesive strip width;
$D$ = brazing material diameter;
$P$ = pitch; and
$W$ = wave height;

application of adhesive at least to the at least partially structured foil within the adhesive strip width on at least some corrugation peaks that are formed by the corrugation; and application of brazing material to the honeycomb structure.

The selection of a suitable average brazing material granular diameter is determined substantially by the foil thickness because it is to be ensured that the foil is not alloyed on. Furthermore, for a person skilled in the art it is readily apparent that the foil thickness used also correlates with the achievable duct density of the honeycomb structure and, thus, also with the wave height of the structured foil. For this reason, an average brazing material granular diameter is proposed here that is less than 15%, in particular, less than 10%, preferably, less than 8%, of the wave height in size. If the wave height is, for example 0.73 mm, as may occur approximately in a honeycomb structure with 1000 cpsi, an average brazing material granular diameter of less than 110 μm should, accordingly, be selected.

Accordingly, the honeycomb structure having at least one structured foil is formed, a multiplicity of structured foils preferably being used. Texturing can be carried out continuously over the entire width and/or length of the foil or, else, have sections with smooth passages. A structure in this sense is, for example, a corrugation or fold in the foil, a regular structure preferably being formed. Structures that are substantially similar to a sinusoidal wave or an involute corrugation that is possibly also interrupted locally or can have another structure (microstructure or macrostructure) superimposed on them have proved particularly suitable. The texturing preferably has extreme points, for example, high points and low points at regular intervals. In the process, the distance between two adjacent high points is referred to as pitch (a type of wavelength), while the wave height (a type of amplitude) defines the distance between the virtual connecting lines of respective high points and low points and is oriented particularly transversely or perpendicularly with respect to the pitch.

The application of adhesive to the structured foil (in particular, composed of an aluminum chrome steel) is carried out substantially along the extreme points of the structure. The adhesive strip width is, preferably, disposed symmetrically with respect to the extreme points, approximately half the adhesive strip width being respectively disposed in the direct vicinity of the extreme points. The adhesive strip width, thus, defines the region on the structured foil in which an adhesive or glue is to be provided that serves to secure the brazing material granules. In consideration of the fact that the extreme points subsequently serve to rest against adjacently disposed foils, in which case a contact region is defined, it is necessary to secure sufficient brazing material particularly in this contact region in order to ensure the connection using a joining technique during subsequent thermal treatment in the contact region. In the process, in particular, the brazing material granule size and the spatial configuration of the adjacent foils with respect to one another play a significant role here.

Depending on the configuration of the structure (in particular, the ratio of pitch to wave height) the spatial configuration of the adjacent foils with respect to one another changes so that, for example, relatively flat or relatively steep pockets are formed in the contact region. It is, then, apparent that, depending on the brazing material granule size used, a configuration of the brazing material granule relatively close to the extreme point is possible if the edges of the structured foil are steep, that is to say, the ratio of the pitch and the wave height is small. If, then, only the quantity of brazing material that is actually necessary to form a connection of the adjacent foils using a joining technique is actually secured in the contact region, the adhesive strip width is to be embodied such that it is possible only for the desired number of brazing material granules with a predefined average brazing material diameter to be disposed in the contact region. At the same time, for example, adhesive is prevented from collecting on the edges of the structured foil, which would possibly result in brazing material that is not required becoming deposited.

In accordance with another mode of the invention, the adhesive strip width is enlarged by an additional width ($Z$), the additional width being in a range between (0.2·D (brazing material granule diameter)) <$Z$<$D$. In particular, the modified adhesive strip width $B_z$ corresponds to the following equation:

$$B_z = B + Z.$$

This additional width is possibly necessary if particularly high thermal and/or dynamic stresses occur during later use. The adhesive strip width is, therefore, enlarged by an amount such that, for example, an additional brazing material granule (with the same under certain circumstances even only with a smaller brazing material granule diameter) can come to be disposed. The method, accordingly, provides the possibility of forming the connections using a joining technique with a type of safety factor, an additional, precisely defined quantity of the brazing material being secured near to the contact point. Such a configuration of additional brazing material is also advantageous, for example, if the honeycomb structure includes relatively thick-walled foils (for example, with a foil thickness of more than 60 μm). The thick-walled foils are of relatively rigid construction in comparison with the relatively thin foils so that, when the foils are wrapped, gaps can form in the contact region that are, then, spanned by the additionally secured brazing material material.

In accordance with a further mode of the invention, the adhesive strip width is determined by a correction value ($K$) that lies in a range from 0 mm to 1 mm, and is subtracted from or added to the adhesive strip width. Accordingly, the modified adhesive strip width $B_{Z,K}$ is determined taking into account the additional width and the correction value according to the following equation:

$$B_{Z,K} = B + Z \pm K.$$

This correction value is to be selected, in particular, in accordance with the foil structure formed. While the above equation for determining the minimum adhesive strip width is based on an substantially sinusoidal corrugation, the correction value permits this calculation to be adapted for square wave forms, for example. In such waveforms that have, in particular, very steep edges, pocket forms that deviate greatly from one another are generated. Particularly in these configurations, a significant change in the pitch/wave height ratio occurs without being able to position a brazing material granule to be secured closer to the contact region, and the adhesive strip width is, thus, substantially unchanged. This effect can be compensated by the correction value.

In accordance with an added mode of the invention, the at least partially structured foil is, firstly, provided with the adhesive, then, a honeycomb structure is formed (for example, by stacking and/or wrapping the foils), and, later, brazing material is applied to the end side of the honeycomb structure. This prevents brazing material from being disposed between the foils and, as such, the adjacent foils are spaced apart from one another. This may possibly result, during subsequent thermal treatment, in the brazing material that has been prepared being deposited merely on one of the foils that are to be connected to one another, thus, not serving to form connections using joining techniques. This effect is avoided here because the foils are only provided with the adhesive before the wrapping. The brazing material is not fed over the end side of the honeycomb structure until the foils have assumed their ultimate position with respect to one another (for example, in the wound or wrapped state). The brazing material continues to adhere to the adhesive within the adhesive strip width here.

It is to be noted, at this point, that, in principle, the honeycomb structure can have both the at least partially structured foils and also smooth foils, it being possible to dispose in each case alternately one smooth and one corrugated foil adjacent to one another. The foils may, for example, be wound in an S-shape, just be stacked on one another, or wrapped in a spiral shape to form the desired shape of the honeycomb structure. The honeycomb structure itself can, accordingly, have a rectangular, oval, or cylindrical form. Depending on the selected types of foil, contact regions between structured foils or between structured or smooth foils or between smooth foils are produced. The configuration of the honeycomb structure by at least one additional smooth foil is particularly preferred here and, in terms of the method of production, the at least one structured foil and the at least one smooth foil is stacked and/or wound such that ducts through which a fluid can flow are formed. The word fluid, in particular, is meant to include gaseous fluids and, specifically, exhaust gases of mobile internal combustion engines. The ducts, preferably, run substantially parallel to one another from one end side of the honeycomb structure to an opposite side.

In accordance with an additional mode of the invention, the adhesive strip width is to be made less than 1.75 mm, in particular, less than 1 mm, and, preferably, less than 0.5 mm. Because, according to the above-mentioned equation, substantially the lower limit for the adhesive strip width at which a permanent connection of the foils that are disposed adjacently to one another is ensured, an upper limit is, then, proposed that is intended to prevent excessive use of brazing material material. In such a context, it is necessary to allow for the fact that there is generally no powderous brazing material that always has the same brazing material granular diameter. Brazing material powders are, usually, provided in a brazing material powder fraction, it being possible to assume a Gaussian distribution whose maximum value is approximately equivalent to the specified brazing material granule size. For the proposed method, in particular, a brazing material granule fraction is to be selected that satisfies significantly stricter criteria than a customary Gaussian distribution. In this respect, brazing material granule fractions with an average brazing material diameter whose variant is less than 0.8, in particular, less than 0.5, and, particularly preferably, less than 0.3 are preferred. It is, thus, possible to ensure that in each case only the desired quantity of brazing material is actually disposed in the cross-section of the honeycomb structure, in particular, only one brazing material granule in each pocket.

In accordance with yet another mode of the invention, the application of the adhesive to the honeycomb structure is performed only over at least a region in the direction of an axis of the honeycomb structure. This means that the adhesive strip width is, possibly, uninterrupted over the length of the structured foil or is formed only over a region starting from the end side or only in the region lying between. This results, for example, in a situation in which only the inlet region and/or the outlet region of the honeycomb structure near to the end side are connected to one another using a joining technique. This has the advantage that it is possible for the honeycomb structure to compensate the thermal expansion behavior because this leads, particularly during the heating and cooling processes, to different changes in length in the interior of the honeycomb structure in comparison with the outer regions.

In accordance with yet a further mode of the invention, the adhesive that has collected outside the adhesive strip width is removed in a cleaning step before applying the brazing material.

It is particularly preferred to use an adhesive that has two adhesive properties that can be adjusted selectively and that can each be activated or deactivated in a repeatable fashion. This means, for example, that the adhesive first has an adhesively active property, deactivates this property under certain circumstances, and recovers its adhesive property by further measures. In accordance with yet an added mode of the invention, it is particularly advantageous to use such an adhesive to manufacture the honeycomb body:

an adhesive property of the adhesive that has collected outside the adhesive strip width being deactivated before the application of brazing material; and/or
  an adhesive property of the adhesive that has collected inside the adhesive strip width being activated before the application of brazing material.

The use of such an adhesive has, for example, the advantage that the adhesive property can be deactivated during the wrapping and/or during the stacking so that it is ensured that the foils that are disposed adjacently slide one on the other. Furthermore, the adhesive has the advantage that the adhesive that has been disposed outside the adhesive strip width due to fabrication tolerances can have its adhesive property removed selectively so that brazing material granules do not become secured in this section. To set the adhesive properties of the adhesive selectively, for example, temperature changes and/or the addition of substances that react chemically with the adhesive are used. For further properties of the adhesive, reference is made at this point to International publication WO 95/30508, corresponding to U.S. Pat. No. 6,371,360 to Maus et al., whose entire disclosure is, thus, also integrated here.

In accordance with yet an additional mode of the invention, the average brazing material diameter of the powderous brazing material is between 40µ and 120µ. As already stated, a particularly small variance is to be ensured here. The selection of the brazing material diameter is made, in particular, with respect to the quantity of brazing material to be made available in order to form a connection using a joining technique, which also withstand the thermal conditions (up to 1000° C.) and dynamic conditions (vehicle vibrations, pressure surges of the exhaust gas) in the exhaust gas system of a passenger car. Because the powderous brazing material is usually provided in each case only in specific sizes (for example, 106µ, 75µ, 50µ), two smaller brazing material granules are possibly to be provided instead of one large brazing material granule per pocket in the cross-section of the honeycomb structure because the required quantity can, then, be set more precisely.

In accordance with again another mode of the invention, after the application of brazing material or after subsequent thermal treatment of the honeycomb structure, a brazing material strip width (L) is generated that substantially has only a tolerance of at maximum 10%, preferably, at maximum 5%, in comparison with the adhesive strip width, and, in particular, is not larger than the adhesive strip width. This means that very limited brazing material strips that run in the pockets are formed. The result of this is that the edges of the foils or the larger part of the channel walls are free from brazing material material, thus improving the resistance of the honeycomb structure to corrosion. In addition, the duct cross-section is not unnecessarily made narrower, which would result in increased ram pressure of the exhaust gas flowing through the honeycomb structure.

In accordance with again a further mode of the invention, honeycomb structure can be introduced at least partially into a housing before the application of brazing material. The result of this is the avoidance of complex securing of the multiplicity of foils during the brazing process because the housing already encloses them. Only partial introduction is advantageous, in particular, if the external periphery of the honeycomb structure is also to be provided with brazing measures that serve to attach the honeycomb structure to the housing. Because the outer pipe or housing has a different thermal expansion behavior from the foils due to the larger thermal mass (greater material thickness of approximately 0.8 to 1.5 mm), this connection between the honeycomb structure and the housing is, preferably, made only on one end side of the honeycomb structure. After the application of brazing material, the honeycomb structure is, then, completely inserted into the housing, and the foils are brazing-materialed to one another, and the foils are brazing-materialed to the housing, during subsequent thermal treatment.

According a further aspect of the invention, a honeycomb structure includes at least partially structured foils so that ducts through which a fluid can flow and that have a pitch and a wave height are formed, adhesive and a powderous brazing material with an average brazing material diameter being provided in regions of contact between the foils within an adhesive strip width. The honeycomb structure is characterized according to the invention in that the adhesive strip width and the brazing material diameter correspond substantially to the following relationship:

$$B = 2 \cdot \sqrt{D \cdot \left[\frac{1}{4} \cdot \frac{P}{W} - 0.0156\right]},$$

where B is the adhesive strip width, D is the average brazing material diameter, P is the pitch, and W is the wave height.

As already stated above, this equation can also be supplemented with an additional width (Z) or the correction value (K). It is to be borne in mind here that the honeycomb structure described is a type of semi-finished product because, in principle, the state is described before thermal treatment, in particular, the brazing process. In the course of the brazing process, some components of the adhesive evaporate so that, after such thermal treatment, the adhesive strip width is no longer recognizable. Despite this, the use of such a semi-finished product can be adopted in order to manufacture honeycomb bodies that are already brazing-materialed.

In accordance with again an added feature of the invention, preferably, the honeycomb structure also includes smooth foils, the honeycomb structure having, according to a further configuration, foils with a foil thickness of less than 180 μm, in particular, less than 100 μm and, preferably, less than 40 μm. The precise feeding of brazing material in the case of foils with a foil thickness of less than 20 μm and, in particular, in the case of foils with a foil thickness of less than 15 μm, is particularly important because with these extremely thin foils there is a relatively high concentration of brazing measures that possibly have a marked influence on the composition of the foil. As a result, it is suitable to manufacture a honeycomb body according to the above method particularly in view of these extremely thin foil thicknesses.

In accordance with again an additional feature of the invention, in terms of the configuration of the structure it is proposed that the wave height (W) be between 4 mm and 0.5 mm, and/or the pitch (P) be between 6 mm and 0.8 mm. The precise application of adhesive, in particular, in accordance with the proposed method, is of particular importance with honeycomb structures with a relatively large number of cells and with relatively small wave height and/or small pitch.

This, preferably, relates to a wave height of less than 1 mm, in particular, less than 0.75 mm or to a pitch of less than 2 mm, in particular, less than 1.5 mm. With the proposed wave height and the proposed pitch, ducts are formed that have a suitable cross-section with respect to the flow resistance. In addition, it is necessary to take into account the fact that the foils are usually also provided with a wash coating that is impregnated with the catalytically active material. The wash coating has the function of making available a particularly rugged large surface in the ducts so that intensive contact between the catalytically active material and the exhaust gas is ensured. If excessively narrow duct shapes are selected, this can lead to blocked ducts, which can have negative effects on the exhaust gas ram pressure upstream of such a honeycomb body.

Although the method is suitable for all known duct densities from 200 cpsi (cells per square inch) to over 1600 cpsi, in accordance with still another feature of the invention, it is particularly advantageous for a honeycomb structure that has a duct density of more than 600 cpsi, in particular, even more than 800 cpsi. The selection of the duct density that describes the number of ducts in a unit area of the cross-section of the honeycomb structure is determined substantially by the use of the honeycomb structure. Furthermore, for example, the foil thickness and/or the waveform is taken into account.

In accordance with still a further feature of the honeycomb body, at least one foil has a secondary structure that defines a region and delimits the extent of the adhesive strip width in the direction of an axis of the honeycomb structure. Secondary structure is understood to be here as a deformation of the foil that runs in a punctiform fashion and/or substantially transversely with respect to the structure of the structured foils. Furthermore, this secondary structure is to be made significantly smaller or flatter so that the secondary structure has, for example, a secondary wave height that is, if appropriate, less than 20%, in particular, less than 10% and, preferably, less than 5% of the wave height of the structured foil. The secondary structure produces a delimitation of the adhesive strip width in the direction of the axis or in the direction of the extent of the extreme points (wave peaks or wave troughs). Furthermore, the secondary structure can have, for example, the function of a sliding rail. This applies, in particular, if the sliding rails are disposed at the edge of the adhesive regions and/or outside. These facilitate the sliding of the foils on one another during wrapping so that the adhesive smears and/or the foils are prevented from sticking to one another undesirably in this phase.

In accordance with a concomitant feature of the invention, it is proposed for at least one foil to have a passivation layer that defines a region and delimits the extent of the adhesive strip width in the direction of an axis of the honeycomb structure. A passivation layer is understood here to be, for example, a chemical substance that has an influence on the adhesive property of the adhesive so that, for example, the adhesive that is disposed outside the desired adhesive strip width is deactivated by contact with the passivation layer, that is to say, it loses its adhesive property (if appropriate permanently). To this extent, the passivation layer can be used not only to delimit an axial region but may also, under certain circumstances, contribute to a situation in which the edges of the structured foils do not have any adhesively effective adhesive outside the desired adhesive strip width.

Other features that are considered as characteristic for the invention are set forth in the appended claims.

Although the invention is illustrated and described herein as embodied in a honeycomb structure and method for applying adhesive and brazing material to the structure, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
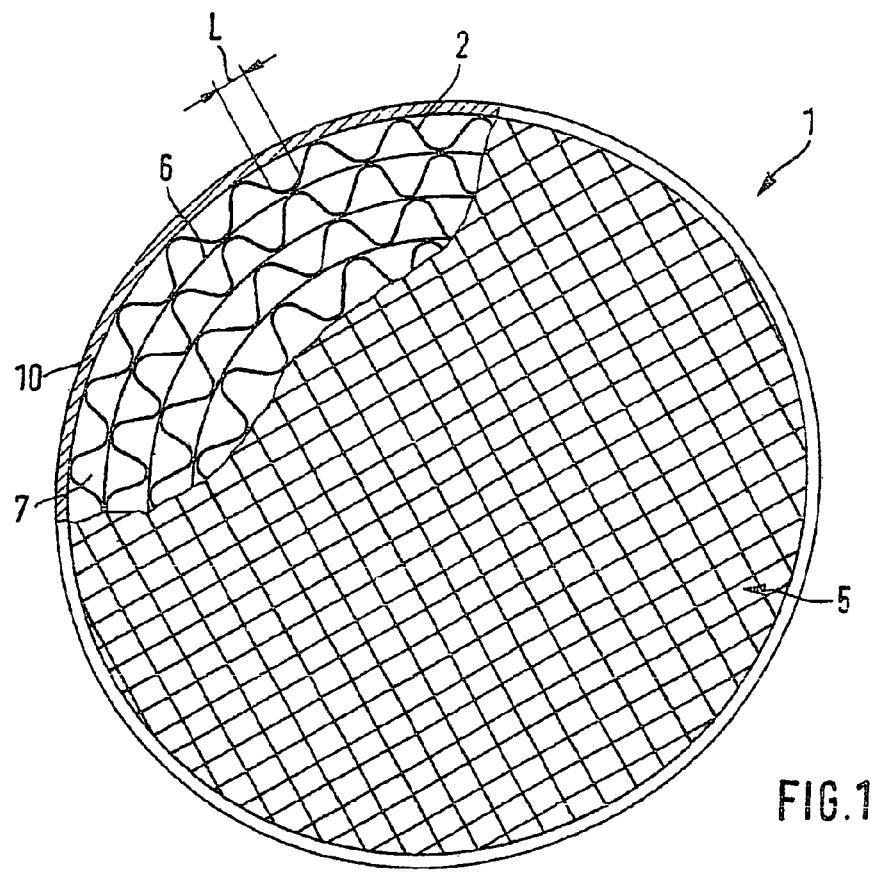
FIG. 1 is a cross-sectional and partially broken away view of an end of a honeycomb structure according to the invention with outer pipes before a brazing process.

Referring now to the figures of the drawings in detail and first, particularly to FIG. 1 thereof, there is shown an end view of a honeycomb structure 1 that has already been completely introduced into a housing 10. The one end side 5 is illustrated in a highly schematic fashion. A partial section shows, in detail, that the honeycomb structure 1 is constructed from smooth foils 6 and structured foils 2 that are wound in a spiral. FIG. 1 shows that the structured foil 2 and the smooth foil 6 define ducts 7 through which an exhaust gas can flow. The ducts 7 have substantially the same duct cross-section and extend virtually parallel with respect to one another from one end side 5 of the honeycomb structure 1 to the opposite end side. The honeycomb structure 1 is illustrated after the brazing step, a brazing material strip width L being formed in the region of contact between the foils. The brazing material strip width L describes, in particular, a region near to the contact region in which a plurality of brazing material granules are disposed one behind the other in the direction of the course of the duct.

Figure 2:
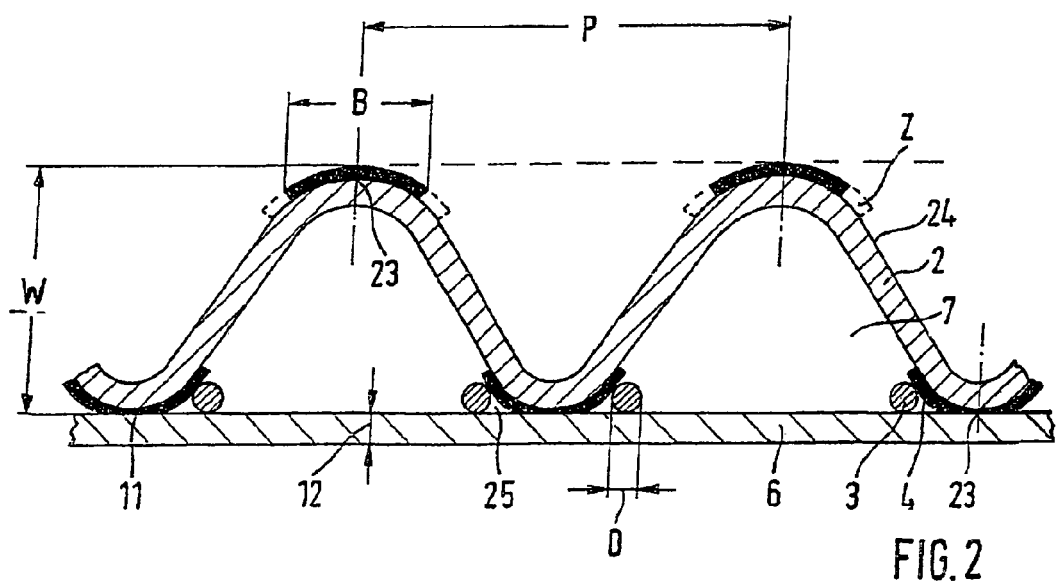
FIG. 2 is a fragmentary, enlarged, cross-sectional view of a schematic configuration of the honeycomb structure of FIG. 1.

FIG. 2 shows a detailed schematic view of a configuration of the honeycomb structure 1. A structured foil 2 and a smooth foil 6 (in the non-bent state) that form a contact point or contact area 11 and delimit channels 7 are illustrated. The structured foil 2 has a pitch P that describes the distance between two adjacent extreme points 23 (from high point to high point or from low point to low point). Furthermore, the structure is characterized by the wave height W that describes the distance between two opposing extreme points 23 (high point to low point). Near to the contact region 11, pockets 25 are formed whose spatial structure depends substantially on the gradient of an edge 24 of the structured foil. The structured foils 2 and/or the smooth foils 6 have a predefined foil thickness 12 here.

Furthermore, FIG. 2 shows the adhesive strip width B that is, preferably, disposed symmetrically with respect to the extreme points 23. The adhesive strip width B may be increased by an additional width Z, the latter being added preferably on both sides of the adhesive strip width B. The adhesive strip width B is selected in such that only the necessary quantity of powderous brazing material 3 is deposited in the pockets 25 due to the adhesive effect of the adhesive 4. There are, preferably, only a very small number of brazing material granules here, in particular, only two and, particularly preferably, only a single brazing material granule per pocket 25 with an average brazing material granule diameter D.

Figure 3:
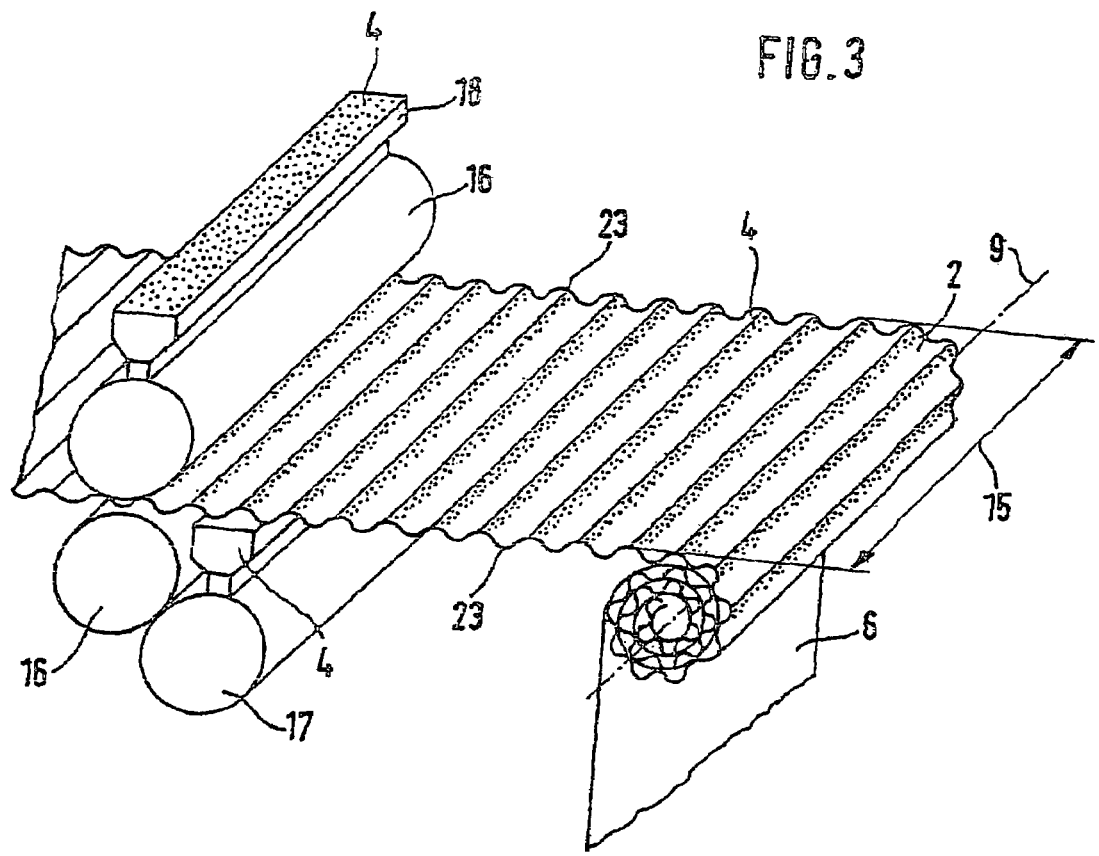
FIG. 3 is a fragmentary, perspective view of a device for applying adhesive to a structured foil according to the invention.

FIG. 3 shows a possible way of applying the adhesive to a structured foil 2. For such a purpose, the structured foil 2 is led through between two distributor rollers 16 that are spaced apart from one another slightly. In the process, the structured foil 2 makes contact with the distributor rollers 16 only with its extreme points 23 (wave troughs and wave peaks) so that a defined adhesive strip width is generated. The distributor roller 16 that is illustrated at the top of FIG. 3 is provided directly with a feeder device 18 by which the adhesive 4 is applied to the surface of the distributor roller 16. The feeder device 18 makes use of gravity here. The distributor roller that is disposed underneath the structured foil 2 is coated with adhesive 4 on its circumferential face by a roller 17, the roller 17 being equipped with a feeder device 18. In the illustrated device, the distributor rollers 16 correspond approximately to the length 15 of the structured foil 2. To this extent, adhesive can also be provided over the entire length 15 within the adhesive strip width.

At this point, it is noted that a person skilled in the art is familiar with a multiplicity of fabrication techniques for manufacturing such adhesive strips. In addition to the illustrated device in which the application of adhesive is carried out by distributor rollers 16, it is also known, for example, to use spray nozzles, adhesive strips, or the like. It is possible here to use a multiplicity of mechanical devices and/or fundamental physical principles, and, for example, specific capillary effects, the force of gravity, pressure, or the like are also available here.

The structured foil 2 to which adhesive has been applied is, then, combined with a smooth foil 6, a honeycomb structure being formed by wrapping them in a spiral fashion about an axis 9.

Figure 4:
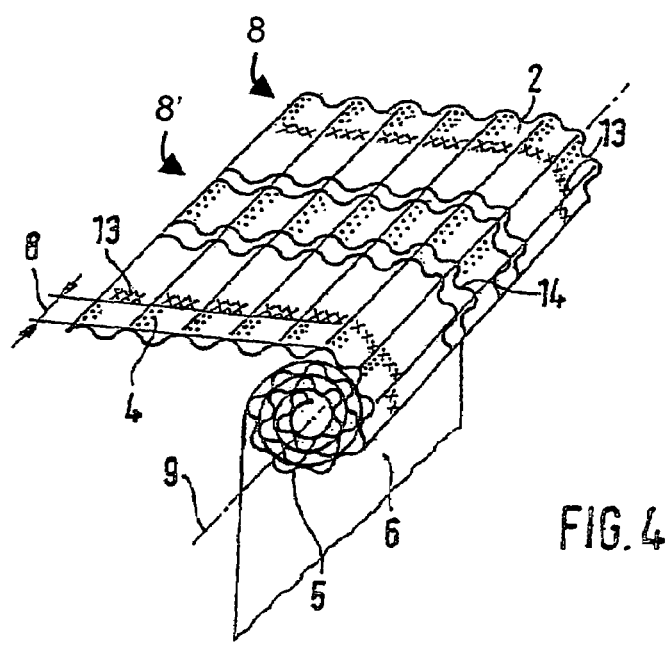
FIG. 4 is a fragmentary, perspective view of a further configuration of the honeycomb structure according to the invention.
Figure 5:
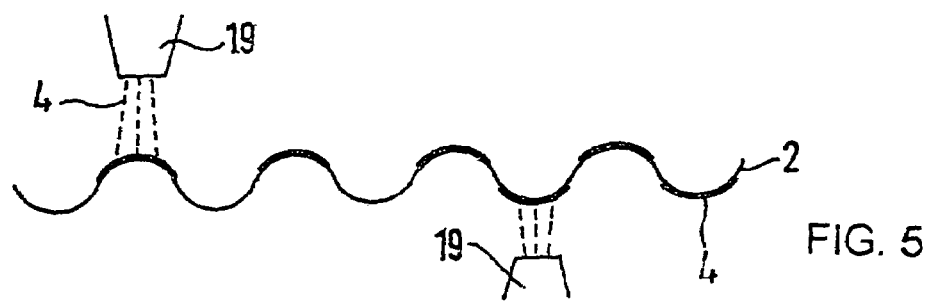
FIG. 5 is a fragmentary, side elevational view of a diagrammatic representation of a step in the sequence of a method according to the invention.

FIG. 4 shows the wrapping process of a structured foil 2 to which adhesive has already been applied and a smooth foil 6, these foils being combined and, in turn, wrapped in a spiral fashion about an axis 9. In contrast to the structured foil 2 that is illustrated in FIG. 3, the adhesive is not applied over the entire length 15 (not indicated in FIG. 4). In FIG. 4, the structured foil 2 has two regions 8 that extend from the end sides 5 to the inner region of the structured foil 2. The regions 8 are bounded by a secondary structure. This secondary structure has the effect of reducing the wave height by a predefined value so that, particularly with respect to the device shown above with distributor rollers 16, the contact is interrupted with these distributor rollers 16. To this extent, adhesive 4 is not applied to the structured foil 2 in the regions with the secondary structure.

Furthermore, the structured foil 2 has a further region 8' in a central area, the extent in the direction of the axis 9 being delimited by a passivation layer 14. The passivation layer 14 can be applied before or after the application of adhesive to the structured foil 2.

FIGS. 5 to 9 are schematic views of a configuration for performing the method according to the invention. According to the first step illustrated in FIG. 5, an adhesive 4 is applied to the structured foil 2. This process is carried out by two nozzles 19 that are disposed on the opposite sides of the structured foil 2. The nozzle 19 or a corresponding device generates in each case adhesive strips on the wave peaks and the wave troughs of the structured foil 2.

Figure 6:
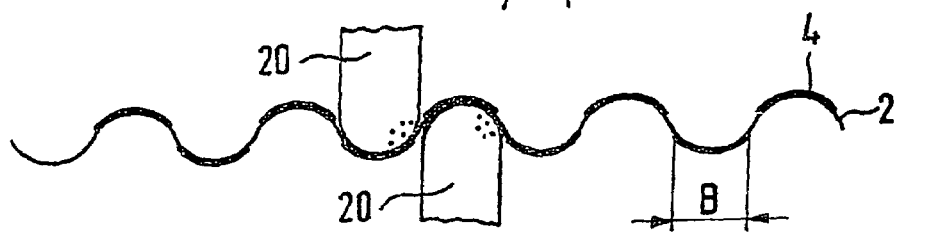
FIG. 6 is a fragmentary, side elevational view of a diagrammatic representation of another step in the sequence of a method according to the invention.

The second step illustrated in FIG. 6 is a schematic view of a cleaning step that removes the portion of the adhesive 4 that projects beyond the adhesive strip width B from the structured foil 2. In terms of the measures that can be used during this cleaning process, a person skilled in the art will resort, in turn, to a plurality of alternatives or combinations thereof. When chemical substances, abrasive media, or mechanical tools are used or selected, adjustment is to be made, in particular, to the necessary fabrication precision. In FIG. 6, the cleaning measures 20 show, for example, a pair of polishing disks that are steeped in solvent that removes the excess adhesive 4 that would lead to undesired brazing material granules becoming deposited.

Figure 7:
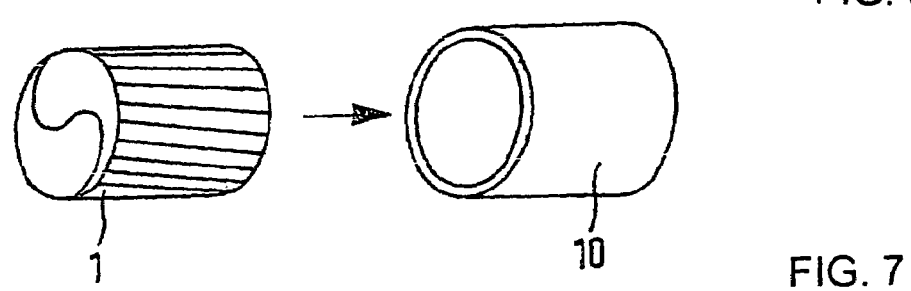
FIG. 7 is a fragmentary, perspective view of a diagrammatic representation of a further step in the sequence of a method according to the invention.

The pretreated structured foils 2 are stacked with a non-illustrated smooth foil 6 and, then, wound in a S shape, as is illustrated in diagrammatic form in FIG. 7. The honeycomb structure 1 that is prepared in this way is partially introduced into a housing 10.

Figure 8:
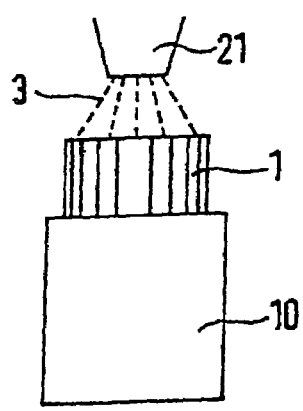
FIG. 8 is a fragmentary, side elevational view of a diagrammatic representation of yet another step of the sequence of a configuration of the proposed method.

In FIG. 8, the brazing process is illustrated, the feeding of powderous brazing material 3 being carried out here by a brazing device 21. The brazing device 21 may be embodied, for example, with a nozzle that feeds the powderous brazing material 3 into the inner regions of the honeycomb structure 1. The feeding can take place here in the direction of the force of gravity or opposed to it by dipping the honeycomb body 1 and the housing 10 at least partially into a fluidized bed that is filled with brazing material powder. If simultaneous application of brazing material to the external circumferential face of the honeycomb structure 1 takes place, an additional adhesive layer is to be applied there after the wrapping process or after the introduction of the honeycomb structure into the housing 10 so that brazing material 3 also remains stuck to the circumferential face of the honeycomb structure 1 later.

Figure 9:
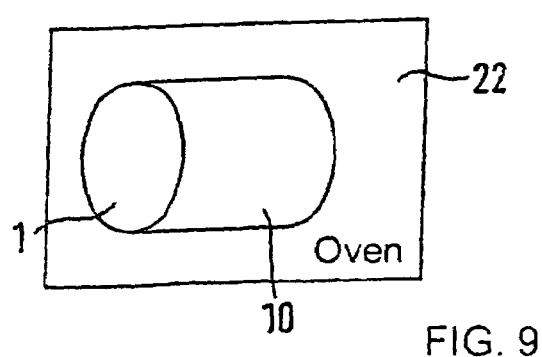
FIG. 9 is a diagrammatic view of still another step in the sequence of a configuration of the proposed method according to the invention.

Finally, the honeycomb structure 1 is introduced completely into the housing 10 and subjected to thermal treatment (the brazing process) in an oven 22 (cf. FIG. 9). The brazing material connections between the foils and between the foils and the housing 10 are, preferably, made here by what is referred to as the high-temperature vacuum brazing method.

The invention, thus, permits the manufacture of a honeycomb body or of a carrier matrix for a catalytically active coating that is suitable for chemically converting noxious substances contained in the exhaust gas of motor vehicle internal combustion engines. As a result, the proposed minimum adhesive strip width ensures the permanent connection despite the thermal and dynamic stresses prevailing there and, at the same time, the excessive use of brazing material is avoided. This results, on one hand, in cost advantages with respect to the manufacture of such a honeycomb structure, but, at the same time, the invention increases the process reliability within the scope of fabrication and the service life of such honeycomb structures.

What is claimed is:

1. A method for producing a honeycomb structure, the method which comprises:
    providing at least one at least partially structured foil having a pitch and a wave height defining a corrugation;
    selecting an average brazing material diameter of a powderous brazing material that is smaller than 15% of the wave height;
    determining a minimum adhesive strip width according to the equation:

$$B = 2 \cdot \sqrt{D \cdot \left[\frac{1}{4} \cdot \frac{P}{W} - 0.0156\right]},$$

where B is the adhesive strip width, D is the average brazing material diameter, P is the pitch, and W is the wave height;
    applying an adhesive at least to the at least partially structured foil within the adhesive strip width on at least some corrugation peaks formed by the corrugation;
    applying brazing material to the honeycomb structure; and
    brazing the at least partially structured foil within the adhesive strip width.

2. The method according to claim 1, which further comprises enlarging the adhesive strip width by an additional width, the additional width being in a range between approximately $(0.2 \cdot D) < Z < D$.

3. The method according to claim 1, which further comprises determining the adhesive strip width by a correction value lying in a range from 0 mm<K<1 mm, and one of:
    subtracting the correction value from the adhesive strip width; and
    adding the correction value to the adhesive strip width.

4. The method according to claim 1, which further comprises:
    first providing the at least partially structured foil with the adhesive;
    subsequently forming the honeycomb structure; and
    subsequently applying brazing material to an end side of the honeycomb structure.

5. The method according to claim 4, which further comprises
    forming the honeycomb structure by at least one additional smooth foil; and
    at least one of stacking and winding the at least one structured foil and the at least one smooth foil to form ducts through which a fluid can flow.

6. The method according to claim 1, which further comprises selecting the adhesive strip width to be less than 1.75 mm.

7. The method according to claim 1, which further comprises selecting the adhesive strip width to be less than 1 mm.

8. The method according to claim 1, which further comprises selecting the adhesive strip width to be less than 0.5 mm.

9. The method according to claim 1, which further comprises carrying out the application of the adhesive to the honeycomb structure only over at least a region in a direction of an axis of the honeycomb structure.

10. The method according to claim 1, which further comprises removing the adhesive that has collected outside the adhesive strip width in a cleaning step before applying the brazing material.

11. The method according to claim 1, which further comprises:
  providing the adhesive with two selectively adjustable adhesive properties that can each be activated or deactivated in a repeatable fashion; and
  at least one of:
    deactivating an adhesive property of the adhesive that has collected outside the adhesive strip width before applying the brazing material; and
    activating an adhesive property of the adhesive that has collected inside the adhesive strip width before applying the brazing material.

12. The method according to claim 1, which further comprises selecting the average brazing material diameter of the powderous brazing material to be between approximately 40 μm and approximately 120 μm.

13. The method according to claim 1, which further comprises:
  one of:
    after applying the brazing material; and
    after subsequent thermal treatment of the honeycomb structure,
  generating a brazing material strip width that substantially has only a tolerance of at maximum 10% in comparison with the adhesive strip width.

14. The method according to claim 1, which further comprises:
  one of:
    after applying the brazing material; and
    after subsequent thermal treatment of the honeycomb structure,
  generating a brazing material strip width that substantially has only a tolerance of at maximum 5%, in comparison with the adhesive strip width.

15. The method according to claim 13 which further comprises generating a brazing material strip width that substantially is not larger than the adhesive strip width.

16. The method according to claim 14 which further comprises generating a brazing material strip width that substantially is not larger than the adhesive strip width.

17. The method according to claim 1, which further comprises introducing the honeycomb structure at least partially into a housing before applying the brazing material.

* * * * *